United States Patent
Dunn et al.

[15] 3,669,048
[45] June 13, 1972

[54] DEVICE FOR, AND METHOD OF, FEEDING LIMP WORKPIECES TO AN APPARATUS

[72] Inventors: Geoffrey Bernard Dunn, Tatsfield, near Westerham; Leonard Ernest York, Hurst Green, Oxted, both of England

[73] Assignee: Sira Institute, Chislehurst, Kent, England

[22] Filed: Aug. 17, 1970

[21] Appl. No.: 64,346

[30] Foreign Application Priority Data

Aug. 18, 1969 Great Britain......................41,148/69

[52] U.S. Cl............................112/121.26, 112/212, 271/45
[51] Int. Cl. .......................................................D05b 21/00
[58] Field of Search ...............112/121.26, 121.27, 203, 212, 112/211, 214; 38/143; 26/51, 54, 63; 271/45

[56] References Cited

UNITED STATES PATENTS

| | | | |
|---|---|---|---|
| 3,310,014 | 3/1967 | Tucci | 112/121.26 X |
| 2,892,427 | 6/1959 | Winberg | 112/211 |
| 3,219,002 | 11/1965 | Levy | 112/121.26 |
| 2,977,905 | 4/1961 | Cobble, Sr. et al. | 112/79 A |
| 3,375,796 | 4/1968 | Greenberg et al. | 112/121.15 |
| 2,630,773 | 3/1953 | Caprara et al. | 112/121.26 |

FOREIGN PATENTS OR APPLICATIONS

| | | | |
|---|---|---|---|
| 937,655 | 9/1963 | Great Britain | 112/121.26 |

*Primary Examiner*—James R. Boler
*Attorney*—Watson, Cole, Grindle & Watson

[57] ABSTRACT

A device for feeding limp workpieces, especially textile piece parts to a processing apparatus and utilizing a flexible belt member entrained around rollers and disposed over a table. The belt member has a working surface facing the table which can adhere to a portion of a workpiece near an outer edge thereof to convey the latter to the operating zone of the apparatus when the belt member is driven around the rollers. Some of the rollers are bodily movable to cause the belt member to conform to the shape of the outer edge of the workpiece which can be straightened as the belt member circulates over the rollers. Puckers can be removed from the workpiece, or gathers produced in the workpiece, by controlling the tension in a part of the belt member.

20 Claims, 4 Drawing Figures

DEVICE FOR, AND METHOD OF, FEEDING LIMP WORKPIECES TO AN APPARATUS

BACKGROUND TO THE INVENTION

The present invention relates to a device for, and a method of, presenting a limp workpiece to an apparatus which thereafter subjects the workpiece to some desired treatment.

The invention is particularly, but not solely, concerned with workpieces in the form of textile fabrics although the invention has application to other forms of limp workpieces such as sheet plastics material or other sheet materials.

SUMMARY OF THE INVENTION

According to one aspect of the invention there is provided a device for presenting a limp workpiece to an apparatus for treatment thereby, said device comprising a movable flexible lamellar member having a working surface, means for bringing the working surface of the member into contact with the workpiece so that the working surface adheres to the workpiece, and means for moving the member so that the workpiece is brought into a position where it can be treated by said apparatus.

According to another aspect of the present invention there is provided a method of presenting a limp workpiece to an apparatus for treatment thereby, said method comprising the steps of bringing a working surface of a movable flexible lamellar member and the workpiece into a pre-determined positional relationship, bringing the working surface of said member and the workpiece into contact so that said working surface adheres to the workpiece, and moving the member to bring the workpiece into a position where the workpiece can be treated by said apparatus.

The term "adheres" is intended to include the situation where the workpiece is gripped between the movable member and the upper surface of a table, for example, by pressure-producing means so that the friction between the workpiece and the working surface is greater than that between the workpiece and the upper surface of the table.

The apparatus which treats the workpiece can act upon an edge of the workpiece which is normally straight or which is shaped. In the latter case, there may be provided means for forming the movable member so that the working surface thereof corresponds in shape to the shaped edge of the workpiece.

In a preferred embodiment the movable member is elongated, more particularly, an endless belt which may be composed of, or include, a resilient material. Where the movable member is in the form of an endless belt, the belt may be entrained around rollers and the forming means may be constituted by some of the rollers which have relatively displaceable rotational axes capable of altering the path of movement of the belt. As the workpiece is conveyed by the belt, the latter is either allowed to revert to its normal state or else subjected to tension so that the shaped edge of the workpiece is caused to be straightened and is presented to the apparatus in this now-straightened state.

The tension in the belt member or in part of the belt member may be altered by bodily moving one or more of the rollers. Where the belt member is resiliently extensible the belt member may be stretched or contracted over a selected portion, for example by driving succeeding rollers at different peripheral speeds. In this way puckers can be removed from a workpiece or, conversely, gathers can be produced in the workpiece.

An arrangement for feeding a succession of workpieces to the device may also be provided. This arrangement may be composed of a conveyor with drive means controllable to present successive workpieces to the movable member in turn. Preferably sensing means is provided to control the operation of the conveyor drive means.

The invention may be better understood, and various other features of the invention may become more apparent, from consideration of the following description.

BRIEF DESCRIPTION OF DRAWINGS

An embodiment of the present invention will now be described, by way of example only, with reference to the accompanying drawings wherein.

DESCRIPTION OF PREFERRED EMBODIMENTS

Figure 1:
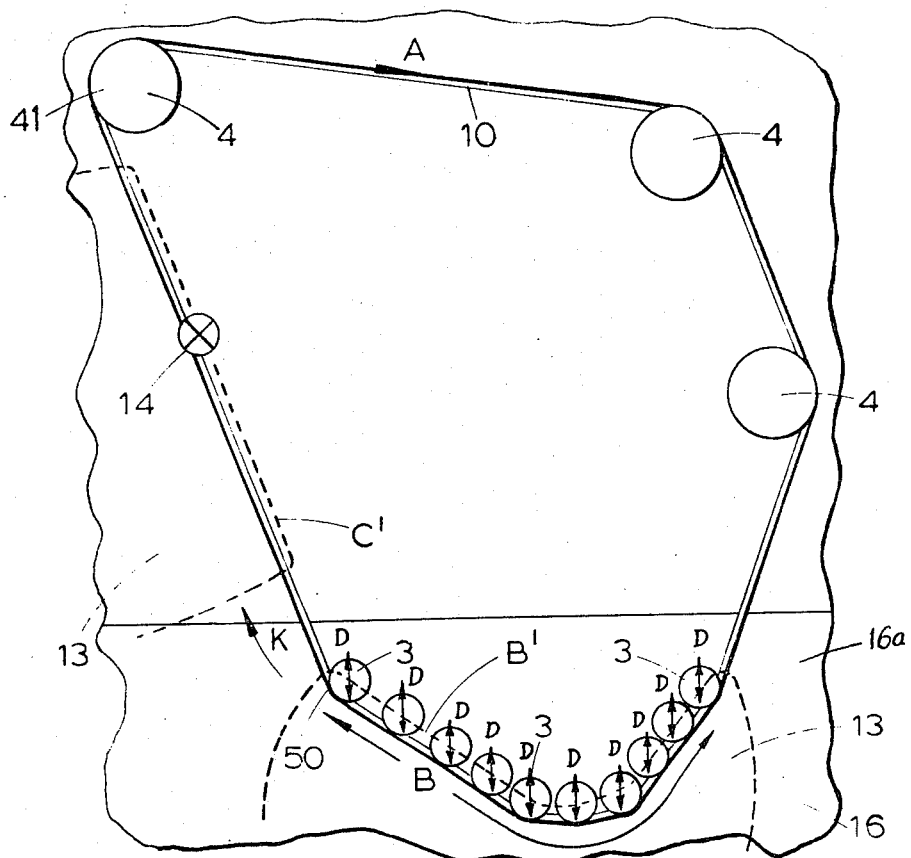
FIG. 1 is a schematic plan view of a device made in accordance with the invention.
Figure 2:
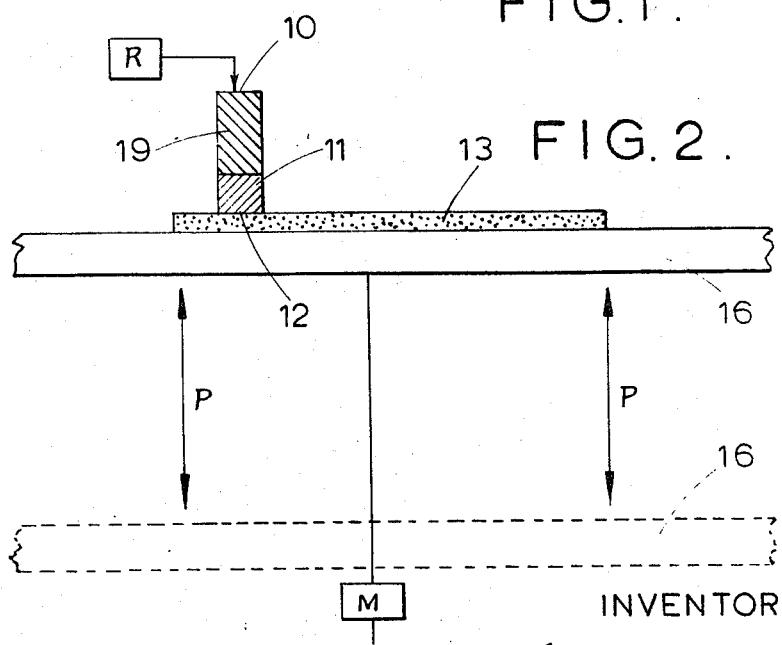
FIG. 2 is a schematic side view of the device shown in FIG. 1.

As shown in FIGS. 1 and 2 of the drawings, the device made in accordance with the invention has a movable lamellar member 10 in the form of an endless flexible belt which may be made partly or completely of a resilient material. The belt member 10 is entrained around a number of rollers and disposed over a table 16. These rollers are composed of shaping or forming rollers 3 and guide rollers 4. The rollers 3 collectively constitute a forming or, more particularly, a deforming means for the member 10 and instead of using rollers to produce the deforming means other constructions are possible, for example, displaceable rods with shaped ends or a one-piece template which may be fixed or adjustable in shape. Thus although the following description refers to the deforming rollers it is to be understood that this is merely one example of the forming means.

The rollers 3, 4 are carried in a frame, not shown in the drawings for the sake of clarity, movable relative to the table 16. The table 16 receives a workpiece which is shown diagrammatically as 13 in FIG. 1. The rotational axes of at least the forming rollers 3 are adjustable in position relative to the frame as represented by arrows D, to alter the shape of a portion of the belt member 10. One or more of the guide rollers 4 are driven to cause the belt member to circulate in the direction of arrow A in FIG. 1. This circulation can be continuous or intermittent. An apparatus for treating the workpiece, generally designated 14, is disposed near the belt member and the function of the apparatus 14, although not pertinent to the invention, will be discussed more fully hereinafter.

The belt member 10 is preferably of multi-part construction and as shown more clearly in FIG. 2, in this example, the belt member 10 has a main body portion 19 which carries a layer of resilient material 11. The outer face of the layer 11 forms a working surface 12 for engagement with a workpiece which is designated 13 in FIG. 2 of the drawings. The workpiece 13 is considered for the purposes of this description to be a limp textile fabric with at least one curvilinear shaped outer edge. By way of example this shaped outer edge is denoted B' in FIG. 1 and the shape of this edge conforms to the shaped portion B of the belt member 10 in FIG. 1.

The working surface 12 of the belt member 10 is intended to adhere to the workpiece 13 and, according to the nature of the materials constituting the workpiece 13 and the layer 11, the working surface 12 may be relatively smooth or provided with some form of gripping elements such as very small pins or hook-like elements as is known in the art. The upper surface of the table 16 which receives the workpiece 13 is preferably smoother than the working surface 12 of the belt member 10 to ensure that the workpiece 13 will be taken up and moved with the belt member 10 when it is brought into engagement with the working surface 12 thereof. As mentioned, the table 16 disposed beneath the belt member 10 and the rollers 3, 4 serves to support the workpiece 13 and this function is performed at least during the time before the workpiece 13 is engaged by the belt member 10. Some means, discussed hereinafter, is provided to enable the workpiece 13 to be subjected to a compressive force established between the belt member 10 and the table 16. In one form this means, denoted M in FIG. 2, moves the table 16 relative to the belt member 10 and in another form this means, denoted R in FIG. 2, acts on the belt member 10.

The operation of the device will now be described. The belt member 10 is circulated over the rollers 3, 4 and the workpiece 13 is placed onto the table 16. This circulation may occur intermittently in synchronism with a working cycle performed by the apparatus 14 and this may be controlled by a sensing unit. The shaped edge of the workpiece 13 is then brought into alignment with the portion of the belt member 10 designated B in FIG. 1. The portion B corresponds in shape to the shaped edge of the workpiece 13 and the forming rollers 3 are used to form the belt member 10 into this shape. The body of the workpiece 13 may extend inwardly from the shaped edge relative to the assembly 3, 4, 10 or outwardly thereof and the latter case is assumed for the purposes of this description. By relatively moving the workpiece 13 and the belt member 10, for example, by moving the table 16 upwardly as represented by the arrows P and the full and dotted lines in FIG. 2, the working surface 12 of the belt member 10 is brought into contact with the workpiece 13 so that the shaped portion B of the belt member 10 lies alongside the shaped edge of the workpiece 13, which is shown as the dotted line B' in FIG. 1.

The engagement between the workpiece 13 and the belt member 10 causes the workpiece 13 to be taken up and moved towards the apparatus 14 in the direction of arrow K in FIG. 1. The table 16 can move away from the workpiece 13 or retain its position to support a sagging part of the workpiece 13 during the movement of the workpiece 13 towards the apparatus 14. As the portion of the belt member 10 that is in engagement with the workpiece 13 moves away from the forming rollers 3 the shaped edge of the workpiece 13 is forced to assume a straightened condition due to the inherent resilience of the belt member 10 or due to tension applied to the member 10. The shaped edge of the workpiece will thus now adopt the position designated by the dotted lines C' in FIG. 1. The now-straightened edge of the workpiece is moved into the operating zone of the apparatus 14 which treats the edge, or a zone adjacent the edge, to some desired process. Where the workpiece 13 is a textile material the apparatus 14 can, for example, effect a sewing operation, produce a seam, or treat the edge in some decorative fashion. By way of further example where the workpiece is in the form of a limp deformable plastics sheet the apparatus may effect a welding process or some other similar treatment.

The workpiece 13 treated by the apparatus 14 is finally conveyed away from the apparatus 14 and can be removed from the belt member 10 by any suitable means. As can be appreciated the process can be continuous with workpieces being successively picked up by the device, conveyed to the apparatus and thereafter removed from the device.

As mentioned the means M can be provided to move the table 16 upwardly to exert pressure between the belt member 10 and the workpiece 13. In this arrangement the belt member 10 can be restrained from vertical movement and the table 16 need not move bodily but can have a raisable portion 16a (FIG. 1) over the desired zone of contact.

Conversely, where the belt member 10 is acted upon, the means R can be a plurality of pressure pads or rollers arranged as a means to urge the belt member 10 in the direction of the table 16 to engage the workpiece 13 over the desired zone. In another construction the forming rollers 3 and the belt member 10 can be shaped to co-operate with one another in urging the belt member 10 towards the table 16 over the desired zone. In some applications it may be desirable to grip the workpiece 13 between the member 10 and the table 16 over the entire process in which case the means for exerting pressure between the member 10 and the table 16 can be modified accordingly. Whatever means is provided to enable the belt member 10 and table 16 to be urged towards one another the table 16 is preferably movable vertically to bring the workpiece 13 into position where the belt member 10 can be brought into contact therewith. Alternatively the table 16 could be fixed in position and the frame carrying the rollers 3, 4 movable relative to the fixed table 16 to achieve this desired effect. It may be desirable to some applications to render the table 16 movable horizontally also.

The multi-part belt member is a preferred feature of this invention since the greater resilience of the layer 11 tends to ensure a more even distribution of force between the belt member 10 and the table 16. Nevertheless a simple one piece belt member 10 can be used.

One or more of the rollers, for example the single roller designated 41 in FIG. 1, can be bodily movable so as to adjust the tension in the belt member 10. In a further refinement, when the belt member 10 is resiliently extensible, two rollers, for example those designed 41 and 50 in FIG. 1, can be driven so that they rotate at different peripheral speeds. If the peripheral speed of, for example, roller 41 exceeds that of roller 50, the belt member 10 will be stretched as it leaves roller 50. The workpiece 13 which has its edge in contact with the belt member 10 will likewise be stretched, and it is thus possible to remove any puckers which may have formed in the workpiece 13 when it was initially picked up by the belt member 10. Conversely when the peripheral speed of roller 50 exceeds that of roller 41, the belt member 10 will leave the roller 50 with less stretch than it had in the region B where the workpiece 13 was picked up. The resulting contraction of the belt member 10 acting on the workpiece 13 may be used to produce gathers in the workpiece 10. Alternatively, both these techniques may be achieved by driving the two rollers 41, 50 at the same peripheral speed and by so engaging the belt member 10 with the rollers 41, 50 that the belt member 10 is stretched between the rollers by a different amount to that provided in the remainder of the belt member 10. In this case it will be necessary to have a positive drive between the belt member 10 and the rollers and this can be fulfilled, for example, by the provision of teeth on the belt member 10 engaging with teeth on the rollers so as to prevent gradual slipping of the belt from equalizing the tension between the different portions of the belt member 10. The workpiece can be fed onto the table 16 automatically or manually, and any suitable arrangement can be provided to automatically feed the workpieces to the device.

Figure 3:
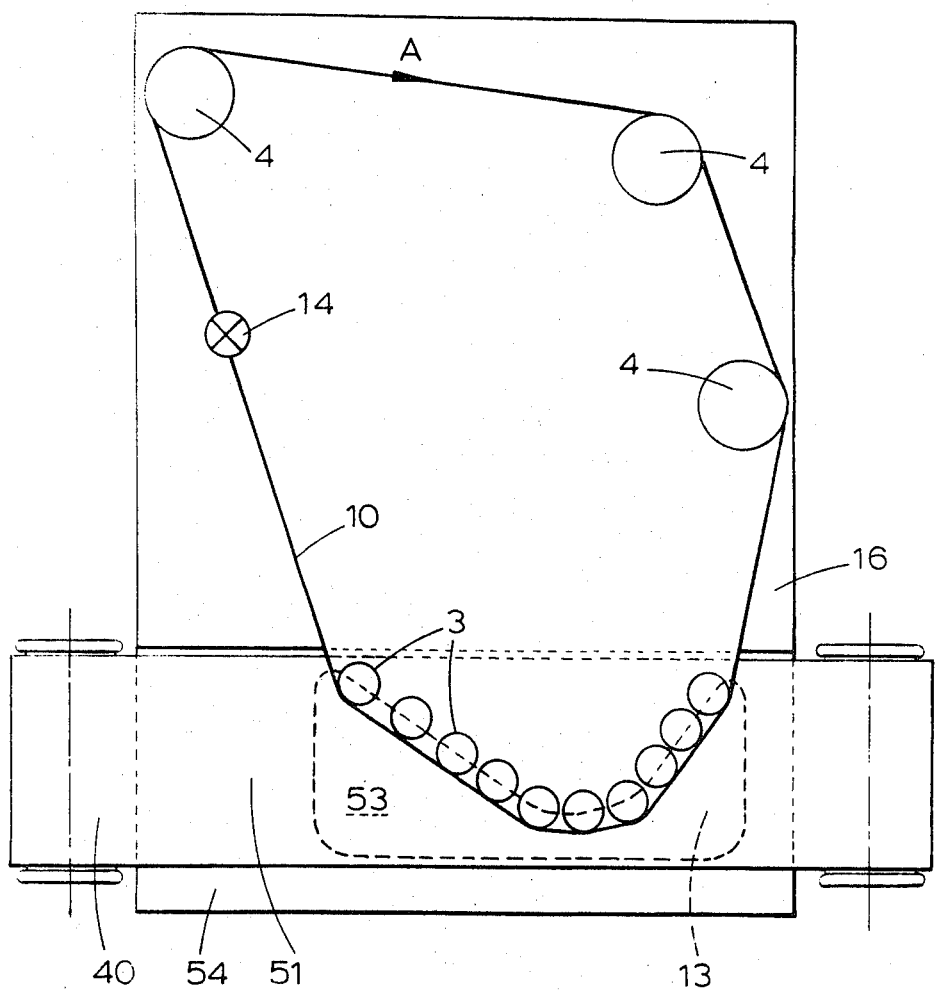
FIG. 3 is a plan view of a device employing a feeding arrangement.
Figure 4:
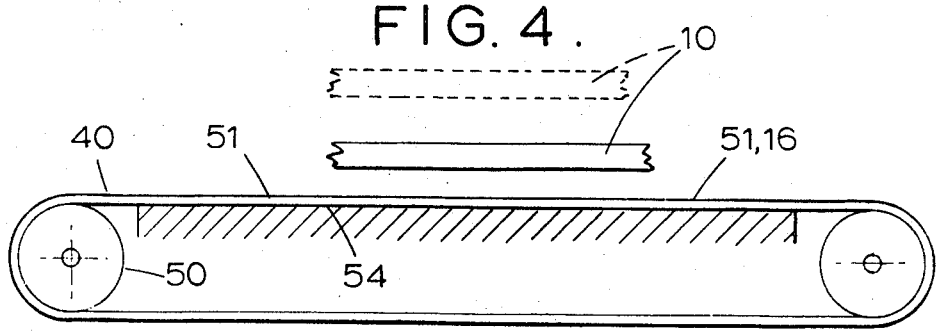
FIG. 4 is a side view of the device depicted in FIG. 3.

A device employing an automatic feeding arrangement is depicted in FIGS. 3 and 4, and like reference numerals have been used to denote like parts shown in FIGS. 1 and 2. As shown in FIGS. 3 and 4, the feeding arrangement is in the form of a conveyor 40 with an upper run 51 disposed substantially co-planar with the main part of the table 16 and adjacent thereto. In this embodiment the table 16 is fixed in position and the frame carrying the rollers 3, 4 is movable in relation to the table 16. The table 16 has a recessed portion 54 which receives the upper run 51 of the conveyor 40 so that the main part of the table 16 is co-planar therewith. The smoothness of the conveyor surface preferably corresponds to that of the table surface.

The conveyor 40 serves to transport workpieces into a position where each workpiece can be engaged by the belt member 10. Thereafter the workpiece in question is transferred to the apparatus 14 for treatment thereby.

The means for driving the conveyor 40 is controlled so that the conveyor 40 is halted when each workpiece is disposed in the position denoted 53 where the belt member 10 can be brought into engagement with the workpiece. One way of achieving this is to synchronize the treatment performed by the apparatus 14 with the movement of the conveyor 40 so that successive workpieces can be placed on the conveyor 40 at a regular spatial interval. The conveyor 40 may then be caused by mechanical or other means to index in position by increments equal to the spatial interval. This interval can be chosen so that a multiple thereof equals the desired distance between the point at which workpieces are placed on the conveyor 40 and the position 53. The conveyor 40 may then be caused to stop at the end of each indexing operating until the member 10 has been moved into contact with the workpiece.

Alternatively, the conveyor 40 could be stopped by the action of sensing means which sensed the arrival of each workpiece in position 53. Such a sensing means might be a combination of a light source and a suitable photodetector, or if apertures were provided in the surface of the conveyor 51 the sensing means could employ pneumatic sensors. Such sensing means could also be used to detect the absence of workpieces in the event that none should be loaded on the conveyor 40. The apparatus 14 could then be prevented from operating until a workpiece is loaded onto the conveyor 40.

The operation of the conveyor 40 on the one hand and of the member 10 and the apparatus 14 on the other hand can be subjected to co-ordination sequence control which may be of any well known kind.

We claim:

1. A method of presenting a limp sheet workpiece to an apparatus for treatment thereby, said method comprising the steps of bringing at least part of a working surface of a movable flexible lamellar member and the workpiece into a pre-determined positional relationship, conforming said part of the working surface to the shape of an outer edge of the workpiece, bringing said conformed part of the working surface into contact with the workpiece adjacent said outer edge so that said conformed part of the working surface adheres to the workpiece, and moving the lamellar member so that said part of said working surface and said workpiece enters the operating zone of the apparatus at which the workpiece can be treated by said apparatus.

2. A method of presenting a limp sheet workpiece to an apparatus for treatment thereby, said method comprising the steps of conforming at least part of a working surface of a movable flexible lamellar member to the shape of an outer edge of the workpiece, bringing said conformed part of the working surface and the outer edge of the workpiece into a pre-determined positional relationship, bringing said conformed part of the working surface into contact with the workpiece adjacent said outer edge so as to adhere thereto, and moving the lamellar member so that said part of said working surface and said workpiece enter the operating zone of said apparatus at which the workpiece can be treated by said apparatus.

3. A method according to claim 1, wherein the lamellar member is constrained for movement along a pre-determined path.

4. A method according to claim 3, wherein said part of the working surface conformed to the shape of the outer edge of the workpiece subsequently changes shape as the lamellar member is moved along said path to alter the shape of the outer edge of the workpiece.

5. A method according to claim 2, wherein the lamellar member is constrained for movement along a pre-determined path.

6. A method according to claim 5, wherein said part of the working surface conformed to the shape of the outer edge of the workpiece subsequently changes shape as the lamellar member is moved along said path to alter the shape of the outer edge of the workpiece.

7. A method according to claim 4, wherein the working surface is conformed to a curved shape corresponding to a curved outer edge of the workpiece, said curved outer edge of the workpiece and said curved shape of the working surface being straightened out as the lamellar member is moved along said path.

8. A method according to claim 6, wherein the working surface is conformed to a curved shape corresponding to a curved outer edge of the workpiece, said curved outer edge of the workpiece and said curved shape of the working surface being straightened out as the lamellar member is moved along said path.

9. A device for presenting a limp workpiece to an apparatus for treatment thereby, said device comprising a movable flexible lamellar member having a working surface, means for conforming at least part of the working surface to the shape of an outer edge of the workpiece, means for bringing said conformed part of the working surface into contact with the workpiece adjacent said edge so as to adhere thereto, and drive means for moving the lamellar member to bring said part of the working surface and said workpiece into the operating zone of the apparatus for treatment thereby.

10. A device according to claim 9, wherein the lamellar member is an endless elongated belt.

11. A device according to claim 10, wherein the endless belt at least includes a resilient deformable material.

12. A device according to claim 10, wherein a plurality of rollers are provided, said endless belt being entrained about said rollers.

13. A device according to claim 12, wherein the drive means rotates at least one of the rollers.

14. A device according to claim 10, wherein the working surface is disposed at an edge of the belt.

15. A device according to claim 9, wherein the means for conforming said part of the working surface includes means for selectively altering the shape to which said part is conformed.

16. A device according to claim 15, wherein the operation of the drive means serves to straighten the conformed part of the working surface as the lamellar member is moved into the operating zone of said apparatus.

17. A device according to claim 12, wherein said conforming means is constituted by several of said rollers, each having relatively displaceable rotational axes.

18. A device according to claim 9 and further comprising a table for receiving the workpiece with the working surface of the lamellar member and the table being disposed to face one another; wherein the means for bringing said conformed part of the working surface into contact with the workpiece includes means for relatively moving the table and the lamellar member.

19. A device according to claim 9 and further comprising a table for receiving the workpiece with the working surface of the lamellar member and the table being disposed to face one another; and means for causing the workpiece to be subjected to compressive force established between the lamellar member and the table.

20. A device according to claim 9 and further comprising an arrangement for feeding workpieces to the lamellar member.

* * * * *